(12) United States Patent
Lund et al.

(10) Patent No.: US 6,762,843 B2
(45) Date of Patent: Jul. 13, 2004

(54) MODULAR INTERFEROMETRIC RECOMBINATION DEVICE AND A BEAM SPLITTER FOR USE IN IT

(75) Inventors: Glenn Lund, Peillon (FR); Thierry Viard, Mandelieu (FR)

(73) Assignee: Alcatel, Paris (FR)

( * ) Notice: Subject to any disclaimer, the term of this patent is extended or adjusted under 35 U.S.C. 154(b) by 120 days.

(21) Appl. No.: 09/908,629

(22) Filed: Jul. 20, 2001

(65) Prior Publication Data

US 2002/0021446 A1 Feb. 21, 2002

(30) Foreign Application Priority Data

Jul. 27, 2000 (FR) .............................................. 00 09834

(51) Int. Cl.$^7$ ................................................. G01B 9/02
(52) U.S. Cl. ........................................................ 356/450
(58) Field of Search .............................. 356/450, 477; 359/627

(56) References Cited

U.S. PATENT DOCUMENTS

| | | | | |
|---|---|---|---|---|
| 5,015,100 A | * | 5/1991 | Doyle ......................... | 356/445 |
| 5,148,318 A | | 9/1992 | Okamoto et al. | |
| 5,208,654 A | * | 5/1993 | Shao et al. .................. | 356/498 |
| 5,734,507 A | * | 3/1998 | Harvey ........................ | 359/639 |
| 5,891,747 A | * | 4/1999 | Farah ......................... | 356/482 |
| 6,075,597 A | * | 6/2000 | Olshausen .................. | 356/450 |
| 6,188,481 B1 | * | 2/2001 | Kumar ........................ | 356/489 |
| 6,219,146 B1 | * | 4/2001 | Innes et al. ................. | 356/508 |

FOREIGN PATENT DOCUMENTS

| | | | |
|---|---|---|---|
| DE | 42 12 271 C1 | 7/1993 | |
| DE | 4212271 | * 7/1993 | ............ H04N/3/10 |
| EP | 0 591 912 A2 | 4/1994 | |
| FR | 2 676 808 | 11/1992 | |
| WO | WO 98/01767 | * 1/1998 | ............. G01S/3/78 |

* cited by examiner

Primary Examiner—Edward J. Glick
Assistant Examiner—Thomas R Artman
(74) Attorney, Agent, or Firm—Sughrue Mion, PLLC

(57) ABSTRACT

The device for interferometric recombination of electromagnetic beams includes one or more modules each including:

at least one splitter assembly ($3_1$) incorporating a beam splitter (5) provided with interceptor means positioned to split an incident beam into portions, one of said portions ($f_1$) passing through the splitter via an aperture provided for that purpose and another portion at least being intercepted by a surface prepared either to reflect it in a determined direction or alternatively to absorb it;

at least one coupler ($4_2$) arranged to recombine the beams that it receives interferometrically, this coupler being obtained by localized splicing of waveguides in accordance with an X or Y structure, each waveguide receiving a beam from a different collector, at least one of the beams corresponding to one of the portions resulting from the splitting effected by a beam splitter.

8 Claims, 3 Drawing Sheets

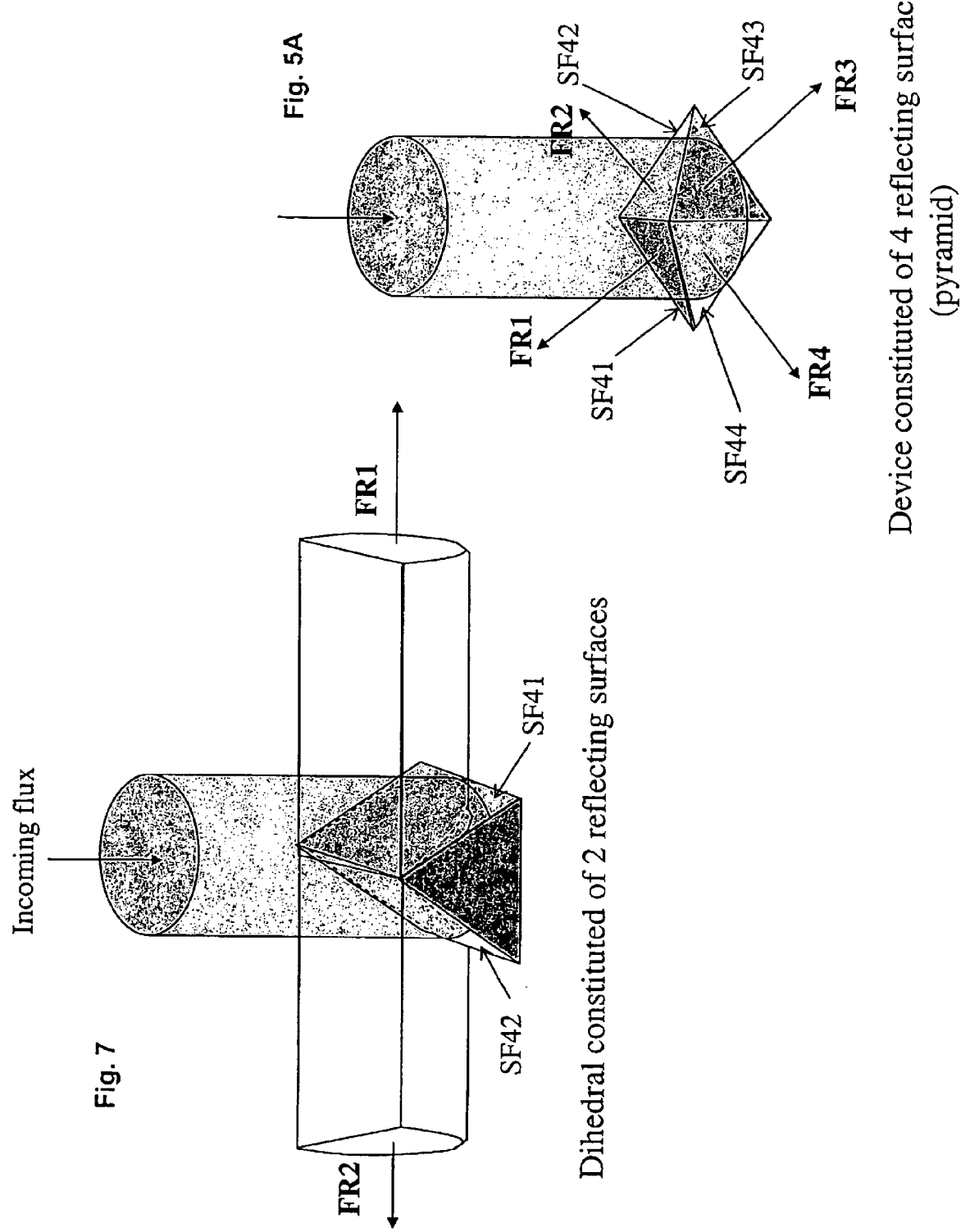

MODULAR INTERFEROMETRIC RECOMBINATION DEVICE AND A BEAM SPLITTER FOR USE IN IT

BACKGROUND OF THE INVENTION

The invention relates to a modular interferometric recombination device and an electromagnetic beam splitter constituting one component of the device.

The device is particularly intended to be used for accurate interferometric recombination of individual electromagnetic beams from the same source object. The device and the splitter are designed to be used with electromagnetic beams consisting of waves allowing such reconstitution and therefore in particular UHF waves or waves in higher frequency bands including optical frequencies extending from the infrared to the ultraviolet via the visible spectrum.

It is possible to synthesize, in terms of its resolving power, a collector, and in particular a large optical collector, from smaller collectors and in a modular manner, for the purposes of astronomical observation, for example. This technique can be used in particular in fields such as remote Earth sensing and spatial astronomy with very high resolution. It is also used to detect weak objects by coronographic interferometry. One of the main problems associated with producing a device operating as an interferometer in accordance with the above technique is to obtain sufficiently accurate recombination of the individual beams from each of the various collectors, referred to as synthesizing collectors, which synthesize the large collector. It is particularly important for the individual beams to have phase and amplitude characteristics that agree exactly with the requirements of the interferometer in which they are superposed.

This problem is complicated by the fact that, in some applications, it is necessary to divide the energy of the individual beam supplied by a synthesizing collector in order to share it between a plurality of arms of the interferometer, which reduces the average amplitude of the energy available in each of the channels defined by those arms.

A second problem that arises is connected with the fact that interference occurs between individual beams at every point in the cross section of the combined beam obtained when individual beams are superposed coaxially. Because of this, the smallest amplitude difference, relative to the ideal level, affecting the spatial distribution of the individual beams transversely to the propagation direction is reflected in an intensity error depending on the spatial distribution. The stored signal that is obtained by detecting the combined individual beams incorporates the cumulative intensity errors and is therefore incorrect. The error affecting the stored signal can vary greatly because it is affected by the slightest variation in the coaxial relationship between the combined individual beams.

In most cases there is provision for interferometric recombination of individual beams from synthesizing collectors, in "pupil" mode, with individual beams that must be perfectly aligned. A semi-transparent plate beam splitter is generally used for this purpose, but the selectivity as a function of wavelength of the reflection and transmission properties of this kind of splitter, which corresponds to chromatic distortion in the visible spectrum, constitutes a serious drawback. The resulting disparities between individual beams induce unacceptable errors that cannot be corrected afterwards and prevent sufficient accuracy of interferometric recombination from being obtained.

SUMMARY OF THE INVENTION

The invention therefore proposes an interferometric recombination device made up of at least one and generally a plurality of recombination modules. It also proposes a beam splitter that can be used as a component of the above recombination device.

The device and consequently the module for producing it are adapted to effect optimum interferometric recombination of individual electromagnetic beams and more particularly of beams derived from the same source by a plurality of associated collectors, in particular to synthesize a large optical collector.

In accordance with one feature of the invention, the modular device includes at least one module including:

at least one splitter assembly incorporating a beam splitter provided with interceptor means positioned to split an incident beam from a collector into portions, one of said portions passing through the splitter via an aperture provided for that purpose and the other portion or portions being intercepted by one or more surfaces of the interceptor means that are each adapted either to reflect a beam portion in a different given direction or alternatively to absorb it, and at least one coupler adapted to effect interferometric recombination of the beams that it receives and which is obtained by localized splicing of waveguides in accordance with an X or Y structure, each of the waveguides receiving a beam from a different collector and at least one of the guides receiving a beam consisting of one of the portions resulting from the splitting effected by a beam splitter.

In one embodiment of the device according to the invention the coupler or each coupler of a module is obtained by localized splicing of at least two monomode optical fibers coupled in an X or Y structure, each of the fibers receiving at an entry end a beam that is transmitted to it from a collector via at least one beam splitter, the beams received by the same coupler coming from different collectors.

In a variant of this embodiment of the device according to the invention a device module includes at least one focusing optic that transmits an incident beam portion coming from a beam splitter toward an entry end of one fiber of a coupler and said optic modulates the amplitude of the beam applied to the entry end of the fiber.

In another variant a module can include at least two beam splitters arranged in cascade.

In one embodiment the device interferometrically recombines optical beams transmitted by collectors in the form of telescopes aimed at the same source of radiation, and includes a plurality of modules as above each associated with at least two collectors in order to effect interferometric recombination of optical beams coming from the collectors.

The invention also provides an electromagnetic beam splitter as defined above.

According to the invention the beam splitter includes interceptor means that are positioned or can be positioned to intercept at least one portion of an incident beam to be split so as to reflect it partly or possibly totally in at least one direction at a reflective surface, the number of directions being fixed by the number of reflective surfaces receiving the beam to be split in the geometrical configuration chosen for the interceptor means, and/or to absorb at least one portion of the beam intercepted by means of an absorbing surface, whilst allowing to pass through it any portion of the incident beam that is not intercepted.

In one embodiment of a splitter according to the invention the interceptor means consist of a plane or curved reflective surface with a circular border that is rendered incomplete by creating an aperture corresponding to the absence of a sector or a segment of the reflective surface so as to split geometrically a beam on whose path said surface is placed to obtain two beams, one reflected by the surface and the other transmitted through the aperture, in proportions corresponding to the respective dimensions of the aperture and the reflective surface on the path of the beam to be split that is split by the splitter.

In another embodiment of a splitter according to the invention the interceptor means consist of a reflective surface with a circular border that is rendered incomplete by creating a central aperture for obtaining the same overall result as that obtained with the embodiment envisaged above.

In another embodiment of a splitter according to the invention the interceptor means consist of a plurality of plane or concave reflective surfaces that are combined and whose contiguous edges delimit lateral faces of a pyramid placed on the path of a beam to be split and whose apex is oriented so that said beam to be split reaches it first, each surface reflecting in a direction specific to it a reflected beam that corresponds to the portion of the beam to be split that it receives.

In a variant embodiment the interceptor means consist of two reflective surfaces combined in a dihedral placed on the path of a beam to be split and whose edge is oriented so that said beam to be split reaches it first, each face reflecting in a direction specific to it a reflected beam that corresponds to the portion of the beam to be split that it receives.

BRIEF DESCRIPTION OF THE INVENTION

The invention, its features and its advantages are explained in the following description, which is given with reference to the drawings listed below.

FIGS. 2, 3, 4, 5, 5A and 7 show various embodiments of beam splitters in accordance with the invention.

DETAILED DESCRIPTION OF THE INVENTION

Figure 1:
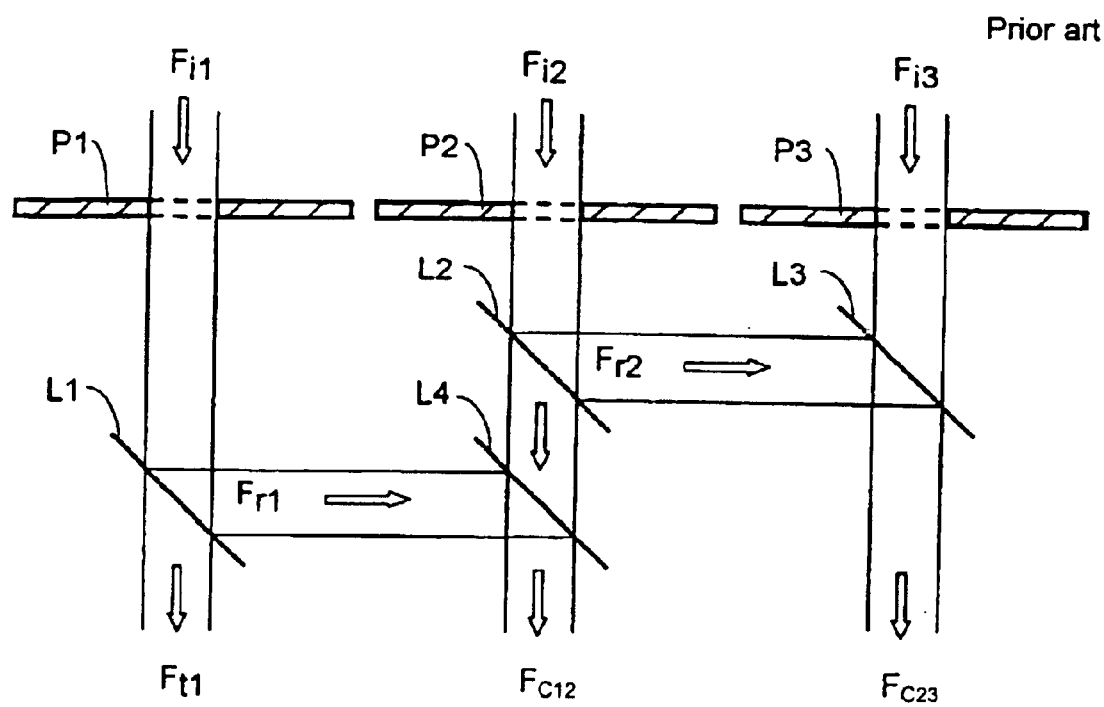
FIG. 1 is a theoretical diagram relating to one example of a prior art beam combination system.

The system shown diagrammatically by way of example in FIG. 1 is for recombining three individual beams $F_{i1}$, $F_{i2}$, $F_{i3}$ from the same optical source, for example a star, not shown. The beams are collected by three collectors of which only the respective exit pupils P1, P2 and P3 are shown.

The incident optical beams are also to be combined in a particular way, for example one portion of the beam $F_{i1}$ with one portion of the beam $F_{i2}$ and another portion of the beam $F_{i2}$ with at least one portion of the beam $F_{i3}$. Semi-transparent plates are placed on the path of the beams for this purpose. One semi-transparent plate L1 is placed on the path of the beam $F_{i1}$, in a manner that is known in the art, so that one portion of the beam passes through it to constitute a beam $F_{t1}$ and another portion of the beam $F_{i1}$ is refracted to form a beam $F_{r1}$. A semi-transparent plate L2 performs the same function in respect of the beam $F_{i2}$ on whose path it is placed. It hence splits the beam $F_{i2}$ into a beam that passes through it and a beam $F_{r2}$ that it refracts.

The refracted beam $F_{r2}$ is directed under particular known conditions toward a semi-transparent plate L3 to be refracted thereby, the semi-transparent plate L3 being disposed on the path of the incident beam $F_{i3}$ so as to enable a portion thereof to pass through it. That portion is then combined with the beam obtained by refraction of the beam $F_{r2}$ at the plate to constitute a beam $F_{c23}$.

In a similar way, the refracted beam $F_{r1}$ is directed toward a semi-transparent plate L4 at which it is refracted again. The plate L4 is placed on the path of the portion of the incident beam $F_{i2}$ that has passed through the plate so that said portion passes through it and is therefore combined with the portion of the beam $F_{r1}$ refracted at the plate L4 to constitute a beam $F_{c12}$.

Obtaining combined beams in this way has the known drawbacks referred to above and is therefore not really satisfactory.

The invention therefore replaces the splitters that the semi-transparent plates constitute, as envisaged hereinabove, with beam splitters in which the splitting is obtained by geometrical means involving no refraction.

This is achieved, in accordance with the invention, by placing on the path of a beam to be split a splitter positioned to intercept the beam so as to reflect it, or possibly absorb it partly or totally, reflection occurring in at least one direction, the number of directions being a function of the geometrical configuration chosen for the interceptor means.

The exact hardware composition of the interceptor means, when they are reflective or absorbent, depends of course on the band of wavelengths in which the beam to be split is located, and the materials can therefore be chosen as a function of the band of wavelengths concerned on the basis of the ordinary technical knowledge of the skilled person.

From the geometrical point of view, the reflectors are components with one or more plane or curved reflective surfaces that are distributed over a body, for example, or possibly combined in a three-dimensional assembly. They can be limited to a single reflective surface or consist of a plurality of reflective faces, for example two reflective faces forming a dihedron or the lateral faces of a pyramid.

Various embodiments are described with reference to FIGS. 2 to 5A and 7. Each assumes a cylindrical incident beam to be split which is centered in the middle of the figure, oriented perpendicularly to the plane of the figure, and transmitted toward the side of the sheet on which the figure is reproduced. The beam cross section is symbolized by a dashed-line circle Fi in these four figures.

Figure 2:
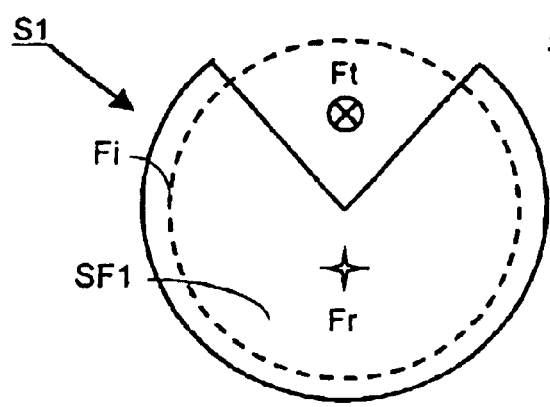
Figure 3:
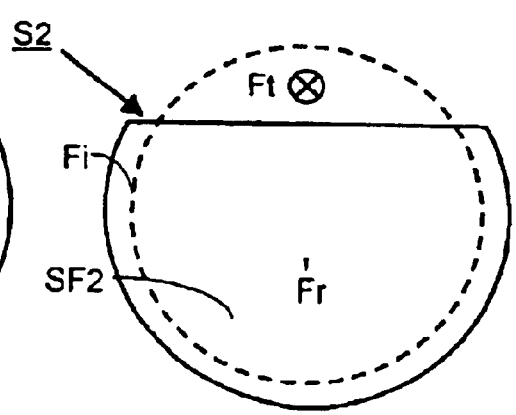
Figure 4:
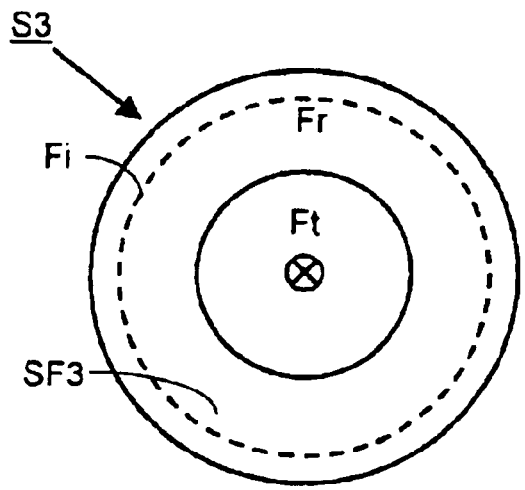

In the embodiments shown in FIGS. 2 to 4, the splitter consists of reflectors positioned so that they intercept only a portion of the incident beam Fi to be split.

The respective splitters S1 and S2 shown diagrammatically in FIGS. 2 and 3 each consist of a component having a circular plane reflective surface SF1 or SF2 that is rendered incomplete by creating an aperture corresponding to the elimination of a sector of a circle in the case of the reflective surface of the splitter S1 and a segment of a circle in the case of the reflective surface of the splitter S2, so that the incident beam Fi is only partly intercepted by the splitter placed on its path. The portion that is not intercepted constitutes a beam Ft whose direction is symbolized by the feathers of an arrow in the figures and whose characteristics are deduced directly from those of the beam Fi from which it is obtained, since it undergoes no transformation. The portion of the beam Fi that is intercepted by the reflective surface of the splitter S1 or S2 is reflected perpendicularly to the plane of the reflective member to form a beam Fr symbolized by the tip of an arrow and whose orientation can be defined accurately, knowing the respective orientations in space of the incident beam Fi and the plane reflective surface SF1 or SF2 constituting the splitter concerned. The reflected beam is therefore not degraded compared to the incident beam and in particular there is no chromatic distortion in the case of an optical beam.

It is therefore possible to define at will the distribution between the transmitted beam Ft and the reflected beam Fr obtained by geometrically splitting an incident beam Fi by determining the respective reflective and aperture areas placed on the path of the incident beam, and for example by varying the angle of the circular sector shape of the aperture. It is further possible to vary the distribution between these beams, in particular for the purposes of adjustment, if the splitter can be moved so that its reflective surface remains parallel to itself, for example, to increase or alternatively to reduce the portion of the reflective surface that is placed on the path of the incident beam Fi.

The variant splitter S3 shown diagrammatically in FIG. 4 by way of example consists of a component whose reflective surface SF3 is annular and plane or frustoconical and has a central circular aperture through which passes a portion of the incident beam Fi that constitutes a beam Ft transmitted without modification. The two aligned beams Fi and Ft differ only in the area of their respective cross sections, which correspond to the dashed-line circle for the incident beam Fi and the smaller circle bordering the central aperture for the transmitted beam Ft. The ratio between these two areas can be varied, as in the preceding embodiments, to obtain the required distribution between the incident beam and the transmitted beam. The portion of the incident beam Fi that is reflected by the reflective annular member S3 can take the form of a cylindrical or convergent frustoconical and axially hollow beam Fr in the latter case.

Figure 5:
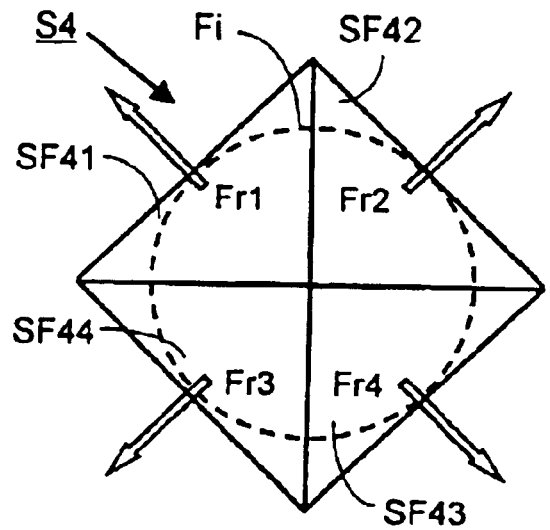

The splitter S4 shown diagrammatically in FIGS. 5 and 5A is one example of a splitter including a reflector intended to be positioned on the path of an incident beam to reflect the whole of the beam in the form of reflected beams oriented in different directions. In the example shown, the reflectors take the form of four surfaces SF41 to SF44 constituting the four lateral faces of a square-base pyramid, at which the incident beam is split into four reflected beams Fr1, Fr2, Fr3 and Fr4, each oriented perpendicularly to one of the lateral faces of the pyramid, as shown by the four arrows in FIGS. 5 and 5A. The distribution of the flux corresponding to the incident beam between four fluxes, each relating to one of the reflected beams, which here is equally divided between the four reflected beams, can also be modified by appropriate movement of the splitter. Other distributions, in particular between a different number of beams, can also be obtained by modifying the spatial geometry of the splitter, which can take the form of a body having two plane reflective faces forming a dihedral (shown in FIG. 7), for example, or the "n" lateral faces of a pyramid with a regular or irregular polygonal base.

The various types of beam splitter referred to above are more particularly intended to be used in interferometric recombination devices and especially in modular devices.

Figure 6:
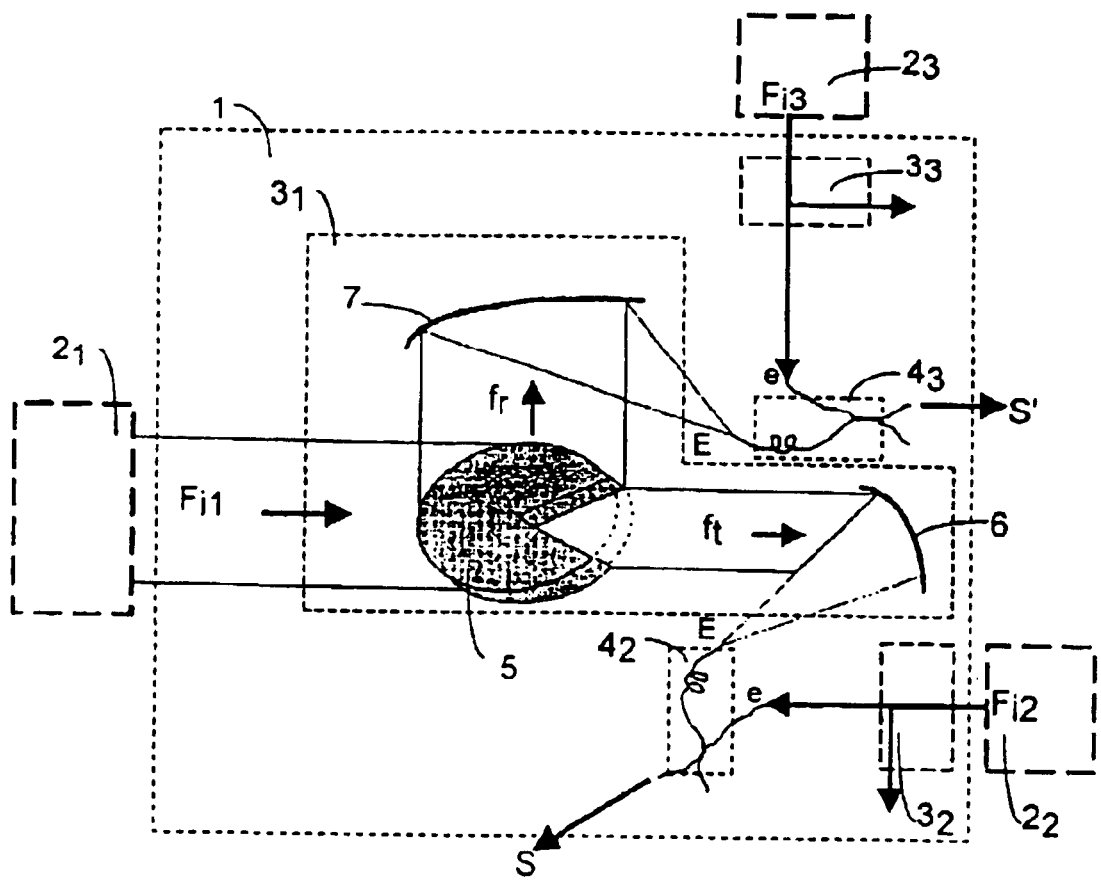
FIG. 6 is a theoretical diagram of an optical beam recombination module of an interferometric recombination device using splitters in accordance with the invention.

Three beams $F_{i1}$, $F_{i2}$, $F_{i3}$ are shown diagrammatically and by way of example in FIG. 6. They are obtained from a source object at a distance that can be regarded as infinite via three synthesizing collectors $2_1$, $2_2$, $2_3$ of a set of associated synthesizing collectors constituting a large modular collector, not shown.

The synthesizing collectors are telescopes aligned on the same optical source to enable interferometric recombination of the beams produced by each of them from the luminous radiation coming from the source that it captures. The various beams are recombined by means of identical or similar and compatible modules associated in a cascade to constitute an interferometer device whose theory is described later.

There is more particularly considered, by way of example, recombination of an individual beam $F_{i1}$ divided into two portions that are separately used for interferometric purposes and which are respectively combined, one with a portion of an individual beam $F_{i2}$ coming from a collector $2_2$, and the other with a portion of an individual beam $F_{i3}$ coming from a collector $2_3$. The interferometric recombination device module in accordance with the invention shown in FIG. 6 essentially includes an optical splitter assembly $3_1$ and one or more optical recombination couplers such as the couplers $4_2$, $4_3$. Each coupler combines one pair of individual optical beams.

The assembly $3_1$ includes a non-dioptric optical splitter 5 adapted to divide the incident individual beam $F_{i1}$ into two co-aligned beams one of which is transmitted directly and the other of which is reflected. The splitter 5 is of the type shown in FIG. 2, for example, and therefore consists of a circular inclined splitter mirror which includes a lateral aperture in the form of a sector of a circle subtending a given angle. This mirror is placed on the path of the incident beam $F_{i1}$ to split the beam in two; a beam $f_r$ is obtained by reflection of one portion of the incident beam $F_{i1}$ and a beam $f_t$ corresponds to the portion of the beam $F_{i1}$ that passes through the aperture in the mirror and is not modified in any way.

The beam $f_t$ passing through the aperture in the splitter mirror is directed toward a focusing mirror 6 which here is part of the optical splitter assembly $3_1$. The focusing mirror directs the beam $f_t$ toward an input E of an optical recombination coupler $4_2$ consisting of two optical fibers operating in the same mode and locally spliced, in a manner that is known in the art, to define an X or Y coupling structure, said input E corresponding, as is known in the art, to one end of a first of the two monomode fibers. A second input e of the coupler $4_2$ corresponding to one end of the second fiber receives in a similar way a beam obtained from a portion of an incident individual beam $F_{i2}$ coming from the collector $2_2$, for example via an optical splitter assembly $3_2$ with the same construction as the splitter assembly $3_1$. As is known in the art, it is possible to vary the amplitude of the wave forming a beam that is applied to the core of a fiber at one end of the fiber by modifying the focusing of the beam to illuminate the core end appropriately.

Because the two fibers constituting the coupler $4_2$ are monomode fibers, the incident wave received by each of them is coupled with the mode that is the only one that each of the two fibers is able to transmit. The beam emerging at a fiber exit end S of the coupler is determined and uniform, with symmetry of revolution about an axis that corresponds to an extension of the longitudinal axis of the fiber, which is assumed to be rectilinear in the exit region, regardless of the shape and the energy distribution of the incident beam, it being assumed that the fibers concerned have a circular cross section.

Consequently, even if the two individual beams injected at the inputs E and e of the coupler $4_2$ have different cross sections and amplitude distributions, interferometric combination is obtained at the junction of the two monomode fibers constituting the coupler and is a function of the phase and the average amplitude of each of the two incident individual beams.

The splitter mirror constituting the splitter 5 is oriented so that the beam $f_r$ that it reflects is directed toward a focusing mirror 7 of the optical splitter assembly $3_1$. The mirror 7 directs the beam toward an input E of a recombination coupler $4_3$ that also consists of two X or Y coupled monomode fibers, said input E corresponding to one end of one of the two monomode fibers of the coupler $4_3$. A second input e of the coupler $4_3$ receives an individual beam from the third of the collectors considered here. In the embodiment proposed the individual beam is supplied by an optical splitter assembly $3_3$, which corresponds to the optical splitter assemblies $3_1$, $3_2$, from the beam $F_{i3}$ that the assembly receives from the collector $4_3$.

The interferometric recombination device modular component which combines an optical beam splitter assembly such as the assembly 3 and at least one recombination coupler consisting of two associated monomode fibers, such as the coupler $4_2$ or the coupler $4_3$, avoids the problems associated with chromatic distortion that affect prior art methods of splitting the energy of the individual beams.

In a variant, a modular component can be adapted to split an individual beam from a collector into an integer number of beams greater than 2 simply by placing an additional splitter mirror that is identical or functionally equivalent to the splitter mirror 5 on the path of one or the other of the beams $f_r$, $f_t$, from the mirror 5, so as to divide that beam $f_r$ or $f_t$ into two portions in a given required ratio.

Associating interferometric recombination device modular components as defined above provides a single-arm or multiple-arm interferometric device that can be used with a plurality of collectors that in combination synthesize a large collector.

The recombination device can consist of a plurality of associated individual modules in the same stage, or possibly over several stages, with splitter mirrors and/or individual modules in cascade.

In particular, the proposed solution significantly reduces the sensitivity of interferometric recombination to the alignment of the recombined individual beams. It also significantly reduces the problems of polarization and superposition of the beams. It further allows precise and achromatic control of the amplitude and phase of the beams and implies only a small number of optical components in each recombination device module.

What is claimed is:

1. A modular device for interferometric recombination of a plurality of electromagnetic or UHF beams or beams in higher frequency bands including optical frequencies from infrared via the visible spectrum to ultraviolet, said beams being obtained from a single source by associated collectors ($2_1$, $2_2$, $2_3$) which synthesize a single large collector, characterized in that said device includes at least one module including:

at least one splitter assembly ($3_1$) incorporating a beam splitter (5) comprising interceptor means (Si, S2, S3 or S4) positioned to split an incident beam from one of said collectors into portions, one of said portions passing through an aperture in the splitter, and another of said portions being intercepted by one or more surfaces of the interceptor means that are each adapted to reflect a beam portion in a different given direction, and at least one coupler ($4_2$) which is adapted to effect interferometric recombination of the beams that it receives, and which comprises locally spliced waveguides in accordance with an X or Y structure, each of the waveguides receiving a beam from a different one of said collectors, and at least one of said waveguides receiving a beam consisting of one of the portions resulting from the splitting effected by a beam splitter.

2. The device according to claim 1 wherein the coupler ($4_2$, $4_3$) of a module comprises at least two locally spliced monomode optical fibers coupled in an X or Y structure, each of the fibers receiving at an entry end a beam that is transmitted to it from one of the collectors via at least one beam splitter, the beams received by the same coupler coming from different ones of said collectors.

3. The device according to claim 2 wherein a module includes at least one focusing optic (6 or 7) that transmits an incident beam portion coming from a beam splitter toward an entry end of one fiber of a coupler and said optic modulates the amplitude of the beam applied to the entry end of the fiber.

4. The device for interferometric recombination according to claim 1 for processing optical beams transmitted by collectors in the form of telescopes aimed at the same source of radiation, characterized in that it includes a plurality of modules each associated with at least two collectors in order to effect interferometric recombination of optical beams coming from said collectors.

5. The device according to claim 1, wherein the interceptor means consist of a plane or curved reflective surface (SF1 or SF2) with a circular border that is rendered incomplete by said aperture, corresponding to the absence of a sector or a segment of the reflective surface, so as to split geometrically a beam (Fi) to be split on whose path said surface is placed to obtain two beams, one (Fr) reflected by the surface and the other (Ft) transmitted through the aperture, in proportions corresponding to the respective dimensions of the aperture and the reflective surface on the path of the beam to be split that is split by the splitter.

6. The device according to claim 1, wherein the interceptor means consist of a reflective surface (SF3), with a circular border, that is rendered incomplete by said aperture, which is a central aperture, for geometrically splitting a beam (Fi) to be split on whose path said surface is placed to obtain two beams, one (Fr) reflected by the surface and the other (Ft) transmitted through the central aperture, in proportions corresponding to the respective dimensions of the aperture and the reflective surface on the path of the beam to be split that is split by the splitter.

7. A modular device for interferometric recombination of a plurality of electromagnetic or UHF beams or beams from a higher frequency range including optical frequencies from infrared through the visible spectrum to ultraviolet, said beams being obtained from a single source by associated collectors ($2_1$, $2_2$, $2_3$) which synthesize a single large collector, characterized in that said device includes at least one module comprising:

a beam splitter (5) having interceptor means (Si, S2, S3 or S4) that are positioned to intercept at least one portion of a plurality of incident beams (Fi) that are from one of said collectors and are to be split so as to reflect said portion at least partly in at least one of a plurality of directions at a reflective surface (SF1), the number of directions being fixed by the number of reflective surfaces (SF1, SF2, SF3 or SF41, SF42, SF43, SF44) receiving the beam (Fi) to be split in a geometrical configuration chosen for the interceptor means; and at least one coupler ($4_2$) which is adapted to effect interferometric recombination of the beams that it receives, and which comprises locally spliced waveguides in accordance with an X or Y structure, each of the waveguides receiving a beam from a different one of said collectors, and at least one of said waveguides receiving a beam consisting of one of the portions resulting from the splitting effected by a beam splitter, wherein the interceptor means consist of a plurality of plane or concave reflective surfaces (SF41 to SF44)

that are combined and whose contiguous edges delimit lateral faces of a pyramid placed on the path of a beam (Fi) to be split and whose apex is oriented so that said beam to be split reaches it first, each surface reflecting in a direction specific to it a reflected beam that corresponds to the portion of the beam to be split that it receives.

8. A modular device for interferometric recombination of a plurality of electromagnetic or UHF beams or beams from a higher frequency range including optical frequencies from infrared through the visible spectrum to ultraviolet, said beams being obtained from a single source by associated collectors ($2_1$, $2_2$, $2_3$) which synthesize a single large collector, characterized in that said device includes at least one module comprising:

a beam splitter (5) having interceptor means (Si, S2, S3 or S4) that are positioned to intercept at least one portion of a plurality of incident beams (Fi) that are from one of said collectors and are to be split so as to reflect said portion at least partly in at least one of a plurality of directions at a reflective surface (SF1), the number of directions being fixed by the number of reflective surfaces (SF1, SF2, SF3 or SF41, SF42, SF43, SF44) receiving the beam (Fi) to be split in a geometrical configuration chosen for the interceptor means; and at least one coupler ($4_2$) which is adapted to effect interferometric recombination of the beams that it receives, and which comprises locally spliced waveguides in accordance with an X or Y structure, each of the waveguides receiving a beam from a different one of said collectors, and at least one of said waveguides receiving a beam consisting of one of the portions resulting from the splitting effected by a beam splitter, wherein the interceptor means consist of two reflective surfaces (SF41 to SF44) combined in a dihedral placed on the path of a beam (Fi) to be split and whose edge is oriented so that said beam to be split reaches it first, each face reflecting in a direction specific to it a reflected beam that corresponds to the portion of the beam to be split that it receives.

* * * * *